United States Patent [19]
Overy

[11] Patent Number: 5,775,526
[45] Date of Patent: Jul. 7, 1998

[54] SEAL FOR A THERMAL FILLER AND CARAFE HOUSING

[75] Inventor: Colin Overy, North Augusta, Canada

[73] Assignee: Black & Decker Inc., Newark, Del.

[21] Appl. No.: 821,187

[22] Filed: Mar. 19, 1997

Related U.S. Application Data

[63] Continuation of Ser. No. 504,215, Jul. 19, 1995, abandoned.

[51] Int. Cl.[6] .............................. A47J 41/02; B65D 25/18
[52] U.S. Cl. .......................... 215/12.1; 220/420; 220/469
[58] Field of Search .................................. 215/12.1, 13.1, 215/233, 234, 343, 354, 232; 220/421, 425, 426, 428, 432, 446, 415, 420, 469

[56] References Cited

U.S. PATENT DOCUMENTS

| | | |
|---|---|---|
| 819,236 | 5/1906 | Lorenz . |
| 826,105 | 7/1906 | Honiss . |
| 841,027 | 1/1907 | Lorenz . |
| 889,531 | 6/1908 | Lorenz . |
| 921,729 | 5/1909 | Paalen ............................ 215/12.1 X |
| 1,199,772 | 10/1916 | Engel . |
| 1,760,321 | 5/1930 | Seigheim . |
| 2,633,261 | 3/1953 | Laird et al. . |
| 2,817,452 | 12/1957 | Bramming . |
| 2,832,491 | 4/1958 | Bramming . |
| 2,832,492 | 4/1958 | Bramming . |
| 2,934,231 | 4/1960 | Bramming . |
| 2,944,690 | 7/1960 | Darmstadt . |
| 3,000,525 | 9/1961 | Leslie-Smith . |
| 3,082,895 | 3/1963 | Leslie-Smith . |
| 3,089,603 | 5/1963 | Leslie-Smith . |
| 3,115,263 | 12/1963 | Leslie-Smith . |
| 3,197,055 | 7/1965 | Kelly . |
| 3,258,147 | 6/1966 | Rownd . |
| 3,727,784 | 4/1973 | Sargent . |
| 3,809,275 | 5/1974 | Ek . |
| 4,351,451 | 9/1982 | Chung ........................... 215/12.1 X |
| 4,527,705 | 7/1985 | Prades . |
| 4,625,884 | 12/1986 | Zimmermann ................ 215/12.1 X |
| 4,630,742 | 12/1986 | Miyaji et al. ................... 215/12.1 |
| 4,718,566 | 1/1988 | Wunder ........................... 215/13.1 |
| 4,754,888 | 7/1988 | Letsch et al. ................... 215/12.1 |
| 4,938,371 | 7/1990 | Vercillo . |
| 5,265,747 | 11/1993 | Gregory et al. . |

FOREIGN PATENT DOCUMENTS

| | | | |
|---|---|---|---|
| 1089485 | 11/1967 | United Kingdom ............ | 215/12.1 |

*Primary Examiner*—Allan N. Shoap
*Assistant Examiner*—Niki M. Kopsidas
*Attorney, Agent, or Firm*—Barry E. Deutsch

[57] ABSTRACT

A carafe having a thermal filler, a housing, and a sealant between the filler and housing. The housing has a top with an annular groove facing a bottom of the housing. The groove has an angled surface between an interior side of the groove and the top of the groove. A neck of the thermal filler is located in the groove with the sealant in the groove forming a seal between the housing and filler.

9 Claims, 2 Drawing Sheets

SEAL FOR A THERMAL FILLER AND CARAFE HOUSING

This application is a continuation of application Ser. No. 08/504,215 filed on Jul. 19, 1995, now abandoned.

BACKGROUND OF THE INVENTION

1. Field of the Invention

The present invention relates to a seal and, more particularly, to a seal between a carafe housing and a thermal filler.

2. Prior Art

U.S. Pat. No. 3,082,895 discloses a vacuum flask with a pouring lip member having an internal annular skirt. U.S. Pat No. 3,000,525 discloses use of a resilient annular sealing member between a canister shoulder and a vacuum flask bottle. The following U.S. Patents disclose other types of containers and seals:

U.S. Pat. No. 819,236 U.S. Pat. No. 826,105
U.S. Pat. No. 841,027 U.S. Pat. No. 889,531
U.S. Pat. No. 1,199,772 U.S. Pat. No. 1,760,321
U.S. Pat. No. 2,633,261 U.S. Pat. No. 2,817,452
U.S. Pat. No. 2,832,491 U.S. Pat. No. 2,832,492
U.S. Pat. No. 2,934,231 U.S. Pat. No. 2,944,690
U.S. Pat. No. 3,089,603 U.S. Pat. No. 3,115,263
U.S. Pat. No. 3,197,055 U.S. Pat. No. 3,258,147
U.S. Pat. No. 3,727,784 U.S. Pat. No. 3,809,275
U.S. Pat. No. 4,527,705 U.S. Pat. No. 4,938,371
U.S. Pat. No. 5,265,747

SUMMARY OF THE INVENTION

In accordance with one embodiment of the present invention a thermal container is provided comprising a thermal filler, a one piece housing member, and a sealant. The one-piece housing member surrounds the thermal filler. The housing has a top with an annular groove facing a bottom of the housing member. The housing member forms an interior side of the groove. A portion of a top neck of the thermal filler is located in the groove. The housing, at the interior side of the groove, extends into an aperture at the top neck of the filler. The sealant is located in the groove between the neck of the filler and the housing.

In accordance with another embodiment of the present invention a carafe is provided comprising a thermal filler, a one-piece housing member, and a sealant. The one-piece housing member surrounds the thermal filler and has a top neck with an annular groove facing a bottom of the housing member. A portion of the groove has an angled surface between a top surface of the groove and an interior side of the groove. A top neck of the thermal filler is located in the groove. The sealant is located in the groove between the neck of the filler and the housing.

In accordance with one method of the present invention a method of assembling a carafe comprises steps of providing a carafe housing having a top with a main aperture therethrough and an interior facing annular groove; inserting a sealant into the groove; and positioning a top neck of a thermal filler into the groove, a portion of the housing at an interior side of the groove extending into a main aperture of the thermal filler, wherein the sealant forms a seal between the housing and the filler.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
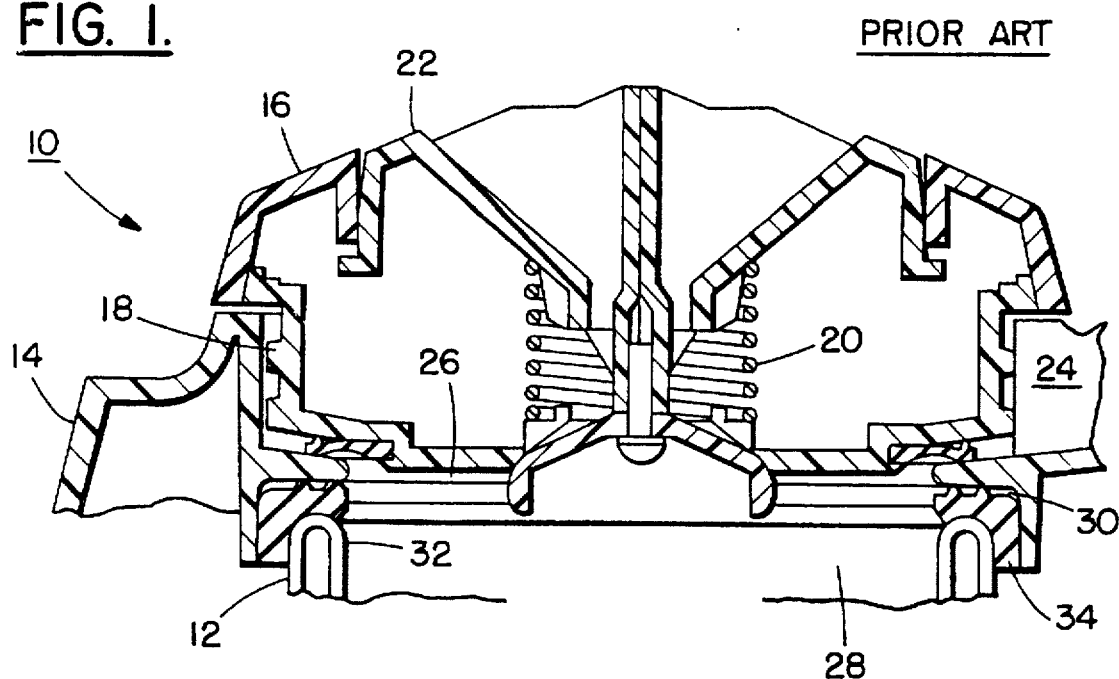
FIG. 1 is a partial cross-sectional view of a carafe known in the prior art.

FIG. 1 shows a carafe 10 known in the prior art. The carafe 10 has a thermal liner or filler 12, a one-piece housing member 14, and a cap 16. The filler 12 is a dual wall vacuum center bottle. The housing member 14 surrounds the filler 12. The cap 16 is removably attached to the top of the housing member 14 at threaded section 18. The cap 16 includes a spring 20 and a spring loaded portion 22. The top of the housing member 14 forms a pour spout 24 and a main opening 26 into a main opening 28 of the filler 12. An annular groove 30 is provided at the main opening 26 of the housing member 14. A one-piece seal member 34 is located in the groove 30 between the neck 32 of the filler 12 and the housing member 14. The filler 12 is compressed against the seal member 34 by suitable members (not shown) attached to the bottom of the housing member 14.

Figure 2:
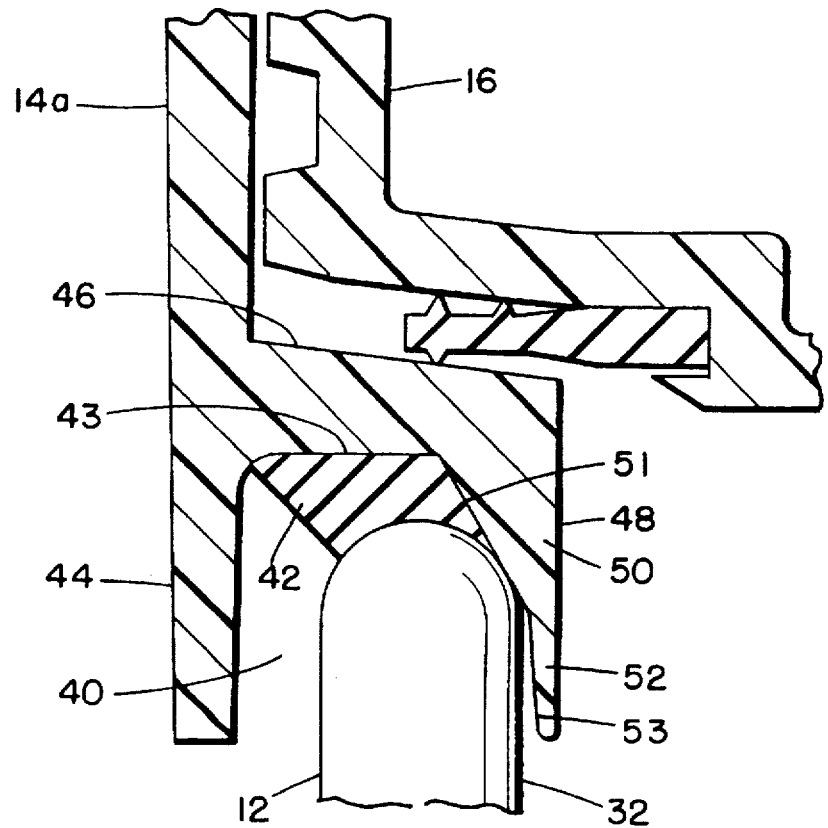
FIG. 2 is an enlarged cross-sectional view of a portion of a carafe incorporating features of the present invention.

Referring now also to FIG. 2, the present invention will be described. The carafe of the present invention is substantially the same as the carafe 10 shown in FIG. 1. However, the annular groove 30 of the housing member 14 has been replaced by the annular groove 40 of the housing member 14a. In addition, the one-piece seal member 34 has been replaced by sealant 42. The sealant 42 is preferably an injectable liquid silicone sealant that cures at room temperature. The housing member 14a surrounds the thermal filler. The method of assembly is also different.

As seen in FIG. 2, the annular groove 40 is formed by an outer portion 44, an inward projection 46, and an inner portion 48. The annular groove 40 is located at the top of the housing member 14a and faces a bottom of the housing member 14a. The inner portion or inner flange 48 has a first section 50 with a relatively shallow sloped inner surface 51 at the groove 40 and a second section 52 with a relatively steep sloped inner surface 53 at the groove 40. Thus, the thickness of the flange 48 or interior side of the groove 40 increases deeper into the groove.

When vacuum center fillers are formed, the dimensions of their necks can vary. More specifically, the inner diameter of their necks can vary. The present invention is adapted to provide a connection system that can accommodate fillers with a wide range of neck diameters, neck circularities, neck perpendicularies, neck fillet radii geometry, and filler overall lengths. The method of assembly generally comprises injecting or otherwise inserting the sealant 42 into the groove 40. The top neck 32 of the filler 12 is then positioned into the groove 40. The inner flange 48 extends into the main aperture 28 of the filler 12 at the top neck 32. The sealant 42 cures and forms a seal between the housing 14a and the filler 12.

Figure 3:
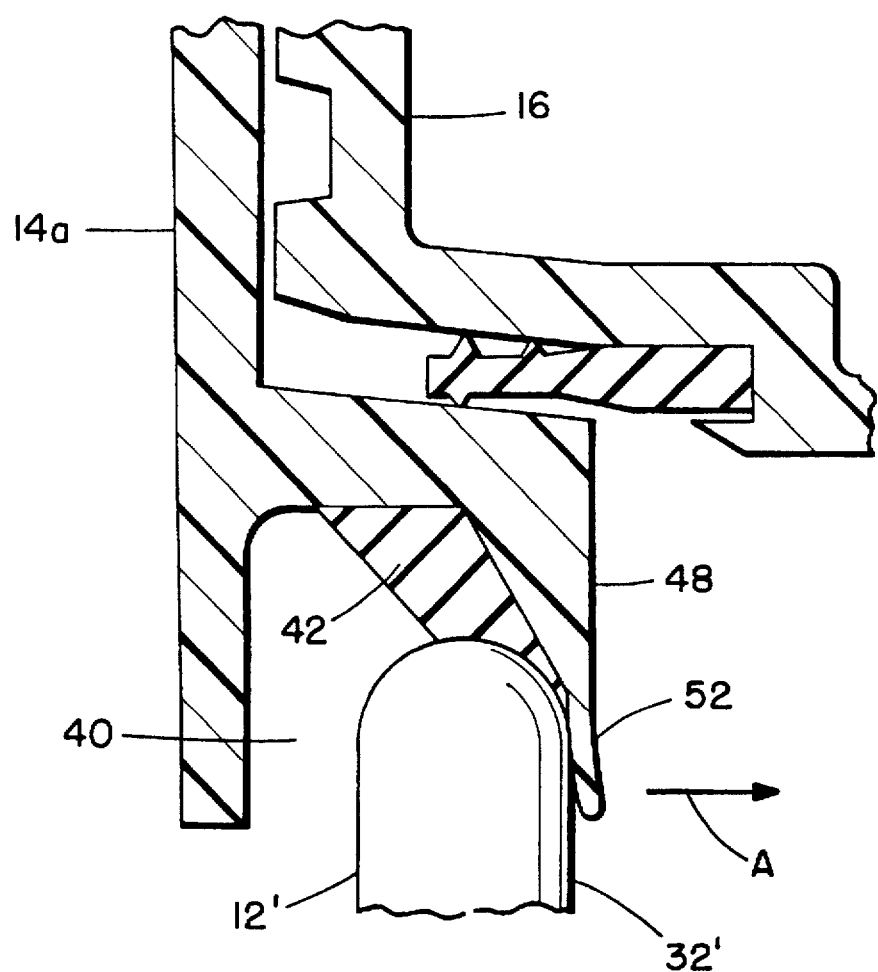
FIG. 3 is an enlarged cross-sectional view as in FIG. 2 of a carafe with a filler having a smaller diameter opening at its top neck.

FIGS. 2 and 3 show carafes with a relatively large diameter filler neck and a relatively small diameter filler neck, respectively. As shown in FIGS. 2, the relatively large diameter filler neck 32 contacts the inner flange 48 at the shallow sloped surface 51 of the first section 50. The filler 12 is biased against the first section 50 by suitable members (not shown) at the bottom of the carafe. The first section 50 is substantially rigid. Therefore, the first section 50 does not substantially deflect inwardly when the filler neck 32 is pressed against it.

The first section, thus, provides the function of keeping the top of the filler neck 32 away from the top surface 43 of the groove 40. This insures that a suitable space will be provided for the sealant 42 even with the relatively large neck fillers. The sealant 42 is pushed by the neck 32 during insertion. As shown in FIG. 3, the relatively small diameter filler neck 32' contacts the inner flange 48 at the steep sloped inner surface 53 of the second section 52. The filler 12' is biased against the second section 52 by suitable members (not shown) at the bottom of the carafe. The second section 52 is thinner than the first section 50. This thin width allows the second section 52 to deflect. The force of the filler neck 32' against the second section 52 causes the inner flange to deflect inward as shown by arrow A. The sealant 42 is pushed by the neck 32' during insertion towards the top surface 43 of the groove 40. Thus, the housing 14a is adapted to use the sealant 42 for assembly, but still allows for variations in filler dimensions. The geometry of the inner flange 48 provides for larger deflectability of the flange 48 the further from the top 43 of the groove 40. The inward deflection of the flange 48 is, thus, automatically adjusted relative to the inner diameter of the filler 12 at its top main opening.

The inner flange 48 centers the filler neck 32 in the housing 14a and, supports the filler 12 in position while the sealant 42 cures. The groove 40, enclosed on three sides, provides a means to locate the sealant 42 and control flow of the sealant during assembly. The inner flange 48 will also obscure the sealant from the user's line of sight. The double taper on the inner flange 48 insures that the widest possible range of neck diameters can be utilized while still having intimate contact between the flange 48 and the inside of the neck 32. This insures that the sealant does not invade the inside of the filler 12. Unlike prior art constructions that used elastomeric seal members between the filler neck and housing, the sealant 42 can automatically flow into its appropriate shape when the filler neck 32 is inserted into the groove 40. Thus, neck geometry of the filler does not need to be as precise as when using the prior art elastomeric seal member. The present invention could be used with any suitable type of thermal container; not merely the thermal carafe described above.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A carafe comprising:

a thermal filler having a neck portion which defines an opening;

a one-piece housing surrounding the thermal filler, the housing having a top with an annular groove facing a bottom of the housing, and a flange forming an interior side of the groove, an upper portion of the neck portion of the thermal filler being located in the groove with the housing at the interior side of the groove extending into the opening at the upper portion of the neck portion of the filler, said flange having a first section with a relatively shallow sloped inner surface which intersects a second section with a relatively steeped sloped inner surface at a corner;

the thickness of the flange increasing deeper into the groove; and said upper portion of said filler engaging one of said first and said second sections.

2. A carafe as in claim 1 wherein the thermal filler is a dual wall vacuum center bottle.

3. A carafe as in claim 2 wherein the sealant is a silicone sealant injected into the groove.

4. A carafe as in claim 3 wherein a portion of the housing extends into an opening at the neck of the filler.

5. A carafe as in claim 1 wherein the second section deflects inwardly when said upper portion of said filler engages said second section.

6. A thermal container comprising:

a thermal filler having a neck portion which defines an opening;

a one-piece housing having a top with an annular groove facing a bottom of the housing, the housing having a flange forming an interior side of the groove, an upper portion of the neck portion of the thermal filler being located in the groove with the housing at the interior side of the groove extending into the opening at the upper portion of the neck portion of the filler, said flange having a first section with a relatively shallow sloped inner surface which intersects a second section with a relatively steeped sloped inner surface at a corner;

the thickness of the flange increasing deeper into the groove;

said upper portion of said filler engaging one of said first and said second sections; and a sealant located in the groove between the neck of the filler and the housing.

7. A thermal container as in claim 6 wherein the thermal filler is a dual wall vacuum center bottle.

8. A thermal container as in claim 6 wherein the sealant is a silicone sealant injected into the groove.

9. A thermal container as in claim 6 wherein the second section of the flange deflects inwardly when said upper portion of said filler engages said second section.

* * * * *